(12) United States Patent
Kwak et al.

(10) Patent No.: US 12,723,873 B2
(45) Date of Patent: Sep. 1, 2026

(54) OVERLAY MEASURING METHOD AND SYSTEM, AND METHOD OF MANUFACTURING A SEMICONDUCTOR DEVICE USING THE SAME

(71) Applicant: Samsung Electronics Co., Ltd., Suwon-si (KR)

(72) Inventors: Inho Kwak, Suwon-si (KR); Jinsun Kim, Suwon-si (KR); Moosong Lee, Suwon-si (KR); Seungyoon Lee, Suwon-si (KR); Jeongjin Lee, Suwon-si (KR); Chan Hwang, Suwon-si (KR); Dohyeon Park, Suwon-si (KR); Yeeun Han, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 320 days.

(21) Appl. No.: 18/460,929

(22) Filed: Sep. 5, 2023

(65) Prior Publication Data

US 2024/0133683 A1 Apr. 25, 2024

(30) Foreign Application Priority Data

Oct. 6, 2022 (KR) ........................ 10-2022-0127736

(51) Int. Cl.
*G01B 15/00* (2006.01)

(52) U.S. Cl.
CPC .................................... *G01B 15/00* (2013.01)

(58) Field of Classification Search
CPC ........... G03F 7/70633; G03F 7/706835; G03F 7/70655; G03F 9/7084; G01B 15/00
See application file for complete search history.

(56) References Cited

U.S. PATENT DOCUMENTS

| | | | |
|---|---|---|---|
| 10,483,214 | B2 | 11/2019 | Dai et al. |
| 10,768,533 | B2 | 9/2020 | Xiao et al. |
| 10,804,170 | B2 | 10/2020 | Shen et al. |
| 10,943,838 | B2 | 3/2021 | Hoo et al. |
| 11,016,398 | B2 | 5/2021 | Lo et al. |
| 11,762,302 | B2 | 9/2023 | Lo et al. |
| 12,169,366 | B2 | 12/2024 | Tabery et al. |

(Continued)

FOREIGN PATENT DOCUMENTS

| | | | | | |
|---|---|---|---|---|---|
| KR | 10-2017-0143485 | A | | 12/2017 | |
| KR | 10-2020-0083588 | A | | 7/2020 | |
| KR | 20200092402 | A | * | 8/2020 | ....... G03F 7/706847 |

OTHER PUBLICATIONS

Taiwanese Office Action and Search Report dated Apr. 16, 2024 issued in Taiwanese Patent Application No. 112135714.

(Continued)

*Primary Examiner* — David E Smith
*Assistant Examiner* — Hsien C Tsai
(74) *Attorney, Agent, or Firm* — Harness, Dickey & Pierce, P.L.C.

(57) ABSTRACT

In an overlay measurement method, an overlay mark having programmed overlay values is provided. The overlay mark is scanned with an electron beam to obtain a voltage contrast image. A defect function that changes according to the overlay value is obtained from voltage contrast image data. Self-cross correlation is performed on the defect function to determine an overlay.

20 Claims, 11 Drawing Sheets

(56) References Cited

U.S. PATENT DOCUMENTS

| | | | | |
|---|---|---|---|---|
| 2003/0021467 | A1 | 1/2003 | Adel et al. | |
| 2015/0285627 | A1* | 10/2015 | Yamaguchi | G01B 15/00 702/150 |
| 2019/0384185 | A1 | 12/2019 | Lo et al. | |
| 2021/0088917 | A1 | 3/2021 | Tabery et al. | |
| 2021/0241449 | A1 | 8/2021 | Wang et al. | |
| 2021/0278771 | A1* | 9/2021 | Lo | H10D 30/62 |
| 2025/0044710 | A1* | 2/2025 | Fu | G03F 7/70616 |

OTHER PUBLICATIONS

Korean Office Action dated May 11, 2026 issued in corresponding Korean Patent Appln. No. 10-2022-0127736.

* cited by examiner

OVERLAY MEASURING METHOD AND SYSTEM, AND METHOD OF MANUFACTURING A SEMICONDUCTOR DEVICE USING THE SAME

CROSS-REFERENCE TO RELATED APPLICATIONS

This application claims priority under 35 U.S.C. § 119 to Korean Patent Application No. 10-2022-0127736, filed on Oct. 6, 2022 in the Korean Intellectual Property Office (KIPO), the contents of which are herein incorporated by reference in their entirety.

BACKGROUND

Various example embodiments relate to an overlay measurement method, an overlay measurement system, and/or a method of manufacturing a semiconductor device using the same. More particularly, some example embodiments relate to an overlay measurement method for measuring an overlay between upper and lower patterns of a semiconductor device, an overlay measurement system of performing the same, and/or a method of manufacturing a semiconductor device using the same.

As a photolithographic overlay margin decreases due to the reduction in design rules of semiconductor products, overlay measurement technology between upper and lower patterns is becoming more important. In a case of a related overlay measurement using an overlay-dedicated key in a scribe lane region, since the overlay analysis is based on 2D image measured at the top of the overlay key, there may be a problem in that the effect of 3-dimensional distortion of the lower pattern cannot be detected.

SUMMARY

Various example embodiments provide an overlay measurement method capable of precisely measuring an overlay between upper and lower patterns.

Alternatively or additionally, various example embodiments provide a method of manufacturing a semiconductor device using the above overlay measurement method.

Alternatively or additionally, various example embodiments provide an overlay measurement system for performing the above overlay measurement method.

According to some example embodiments, in an overlay measurement method, an overlay mark having programmed overlay values is provided. The overlay mark is scanned with an electron beam to obtain a voltage contrast image. A defect function that changes according to the overlay value is obtained from voltage contrast image data. Self-cross correlation is performed on the defect function to determine an overlay.

Alternatively or additionally, according to some example embodiments, in an overlay measurement method, at least one overlay mark is scanned with an electron beam, the at least overlay mark including upper structures misaligned with respect to lower structures so as to have programmed overlay values. Secondary electrons that are emitted from the overlay mark are detected to obtain voltage contrast data. A defect function of a voltage contrast for overlay is obtained from the voltage contrast data. A function that is symmetric about overlay axis of the defect function is obtained. A cross correlation between the defect function and the symmetric function is performed to calculate an overlay value.

Alternatively or additionally, in some example embodiments, in a method of manufacturing a semiconductor device, a first multi-layered structure is formed in a first region of a substrate, the first multi-layered structure having a first upper structure on a first lower structure by a semiconductor process. At least one overlay mark is formed in a second region of the substrate, the at least overlay mark including second multi-layered structures having second upper structures misaligned with respect to second lower structures so as to have programmed overlay values by the same semiconductor process. The at least one overlay mark is scanned with an electron beam to detect secondary electrons. A voltage contrast image is obtained from the detected secondary electrons. A defect function that changes according to the overlay value is obtained from the voltage contrast image data. Self-cross correlation is performed on the defect function to determine an overlay between the first lower structure and the first upper structure.

Alternatively or additionally, according to some example embodiments, in an overlay measurement method, electrons emitted from overlay marks that are formed in a scribe lane region of a wafer may be detected to obtain a voltage contrast image. A defect function of a voltage contrast for overlay may be generated from the voltage contrast image data, and self-cross correlation may be performed on the defect function to determine an overlay. In some example embodiments, a differential function of the defect function may be generated, and self-cross correlation may be performed on the differential function to determine a quantified value of the asymmetry.

According to the overlay measurement method, a more accurate overlay value and a more quantified value for the asymmetry may be obtained by reflecting the effect of 3D distortion of a lower pattern, which may not be detected in other overlay measurement methods. Accordingly, it may be possible to identify the cause of the 3D distortion of the lower pattern, improve the defect margin, and/or improve the yield.

BRIEF DESCRIPTION OF THE DRAWINGS

Some example embodiments will be more clearly understood from the following detailed description taken in conjunction with the accompanying drawings.

FIG. 1 is a cross-sectional view illustrating an overlay measurement system in accordance with some example embodiments.

FIG. 2 is a plan view illustrating a wafer having overlay marks formed thereon to be measured by the overlay measurement system in FIG. 1.

FIG. 3 is an enlarged plan view illustrating portion 'A' in FIG. 2.

FIG. 4 is a plan view illustrating the overlay mark in FIG. 3.

FIG. 5 is a diagram illustrating a map that represents programmed overlay values of the overlay mark of FIG. 4.

FIG. 6 is a diagram illustrating a voltage contrast image of the overlay mark of FIG. 4.

FIG. 7 is a block diagram illustrating a processor of the overlay measurement system of FIG. 1.

FIG. 8 are graphs illustrating a defect function and a symmetric function of the defect function respectively generated by a first function generator and a second function generator in FIG. 7.

FIG. 9 is a graph illustrating cross correlation between the defect function and its symmetric function performed by a cross correlation analyzer in FIG. 7.

FIG. 10 is graphs illustrating a differential function of the defect function and a symmetric function of the differential function respectively generated by the first function generator and the second function generators in FIG. 7.

FIG. 11 is a graph illustrating cross correlation between the differential function and its symmetric function performed by the cross correlation analyzer in FIG. 7.

FIG. 12 is a flow chart illustrating an overlay measurement method in accordance with some example embodiments.

FIG. 13 is a flow chart illustrating an overlay determination step in the overlay measurement method of FIG. 12.

FIG. 14 is a flow chart illustrating an asymmetry determining step in the overlay measurement method of FIG. 12.

FIG. 15 is a cross-sectional view illustrating a step of forming an upper structure on a lower structure of a semiconductor device in accordance with some example embodiments, and a graph illustrated a measured overlay between the upper structure and the lower structure.

FIG. 16 is a plan view illustrating the upper structure formed on the lower structure in FIG. 15.

DETAILED DESCRIPTION OF VARIOUS EXAMPLE EMBODIMENTS

Hereinafter, some example embodiments will be explained in detail with reference to the accompanying drawings.

Figure 1:
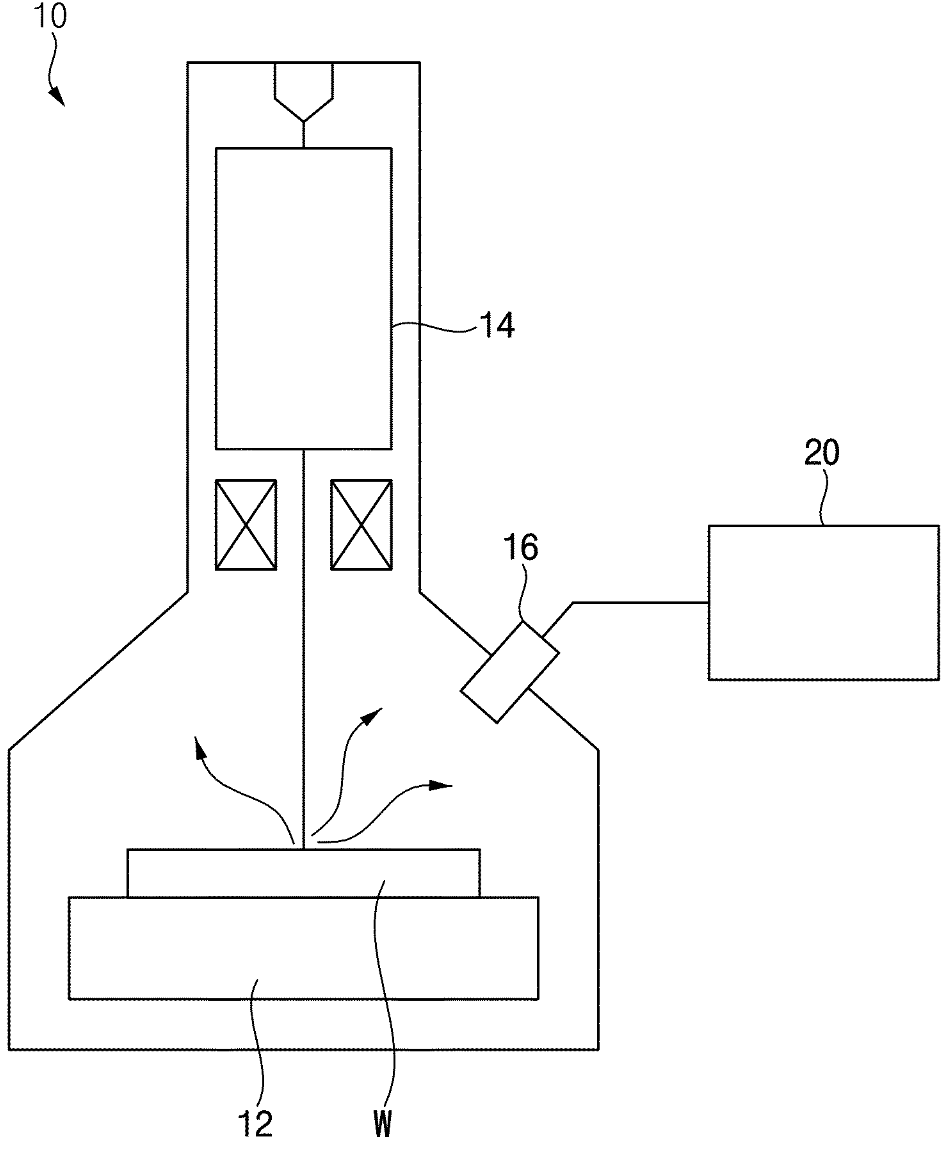
FIGS. 1 to 16 represent non-limiting, example embodiments as described herein.
Figure 2:
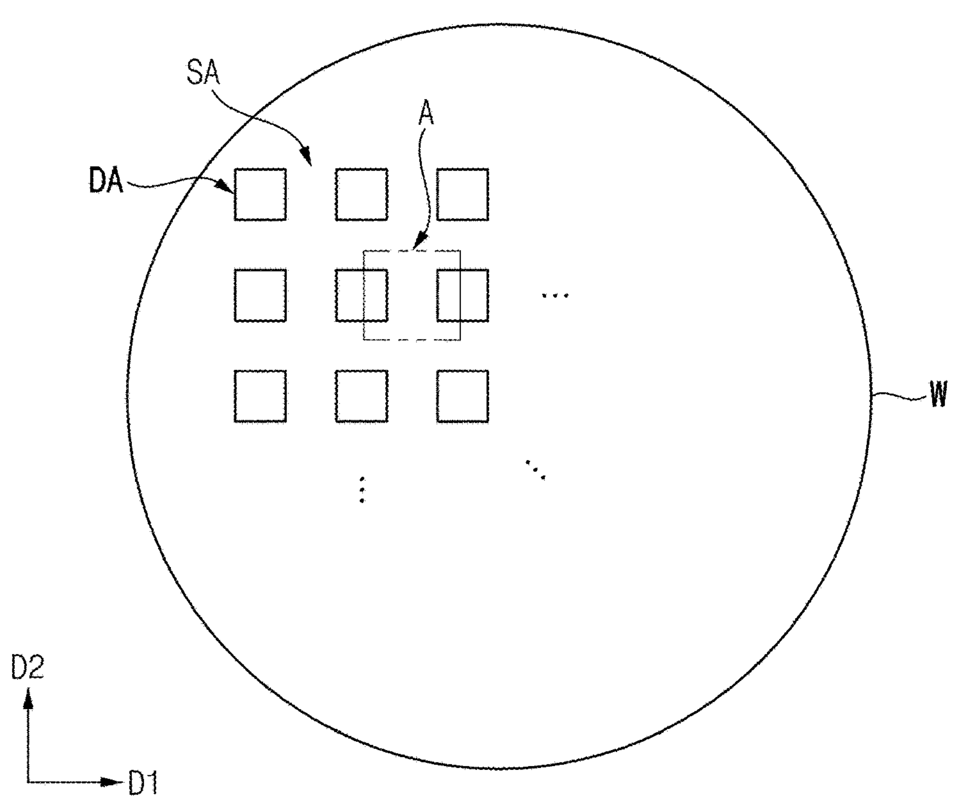
Figure 3:
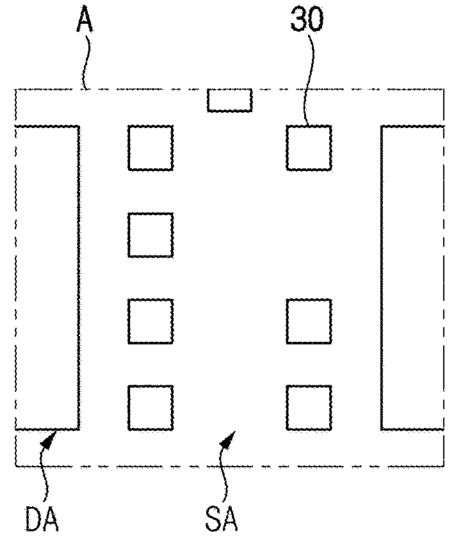
Figure 4:
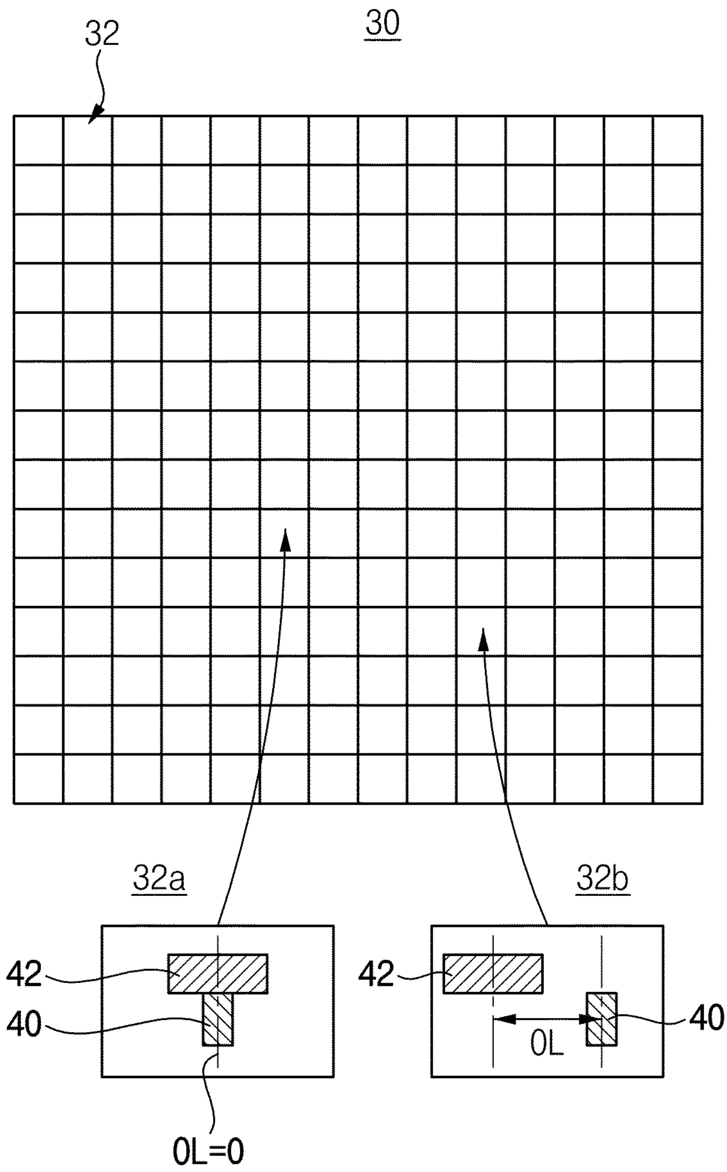
Figure 5:
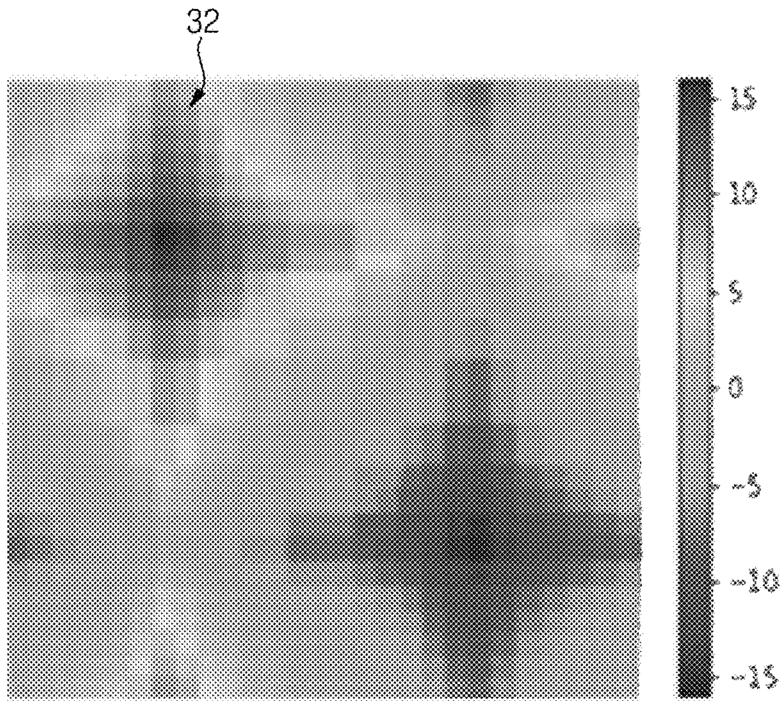
Figure 6:
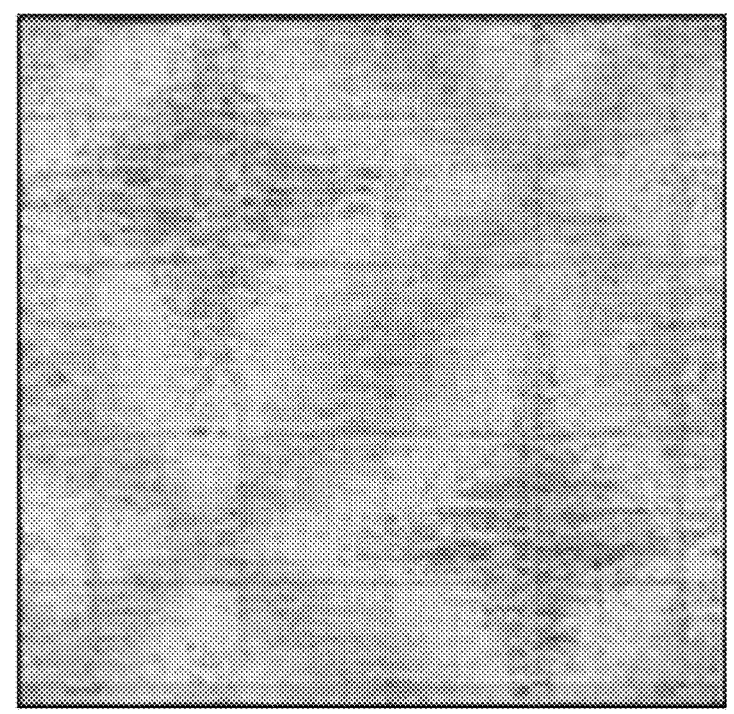

FIG. 1 is a cross-sectional view illustrating an overlay measurement system in accordance with some example embodiments. FIG. 2 is a plan view illustrating a wafer having overlay marks formed thereon, that are to be measured by the overlay measurement system in FIG. 1. FIG. 3 is an enlarged plan view illustrating portion 'A' in FIG. 2. FIG. 4 is a plan view illustrating the overlay mark in FIG. 3. FIG. 5 is a diagram illustrating a map that represents programmed overlay values of the overlay mark of FIG. 4. FIG. 6 is a diagram illustrating a voltage contrast image of the overlay mark of FIG. 4.

Referring to FIGS. 1 to 6, an overlay measurement system may include an electronic optical system 10 that is configured to irradiate an electron beam onto a sample, such as a semiconductor wafer W upon which a multi-layered structure is formed, and to detect electrons emitted from the sample, and a processor 20 configured to acquire and analyze an image from the electrons detected by the electronic optical system 10 so as to calculate an overlay between an upper layer and a lower layer of the multi-layered structure.

In some example embodiments, the overlay measurement system may be used to measure an overlay between a previously patterned first layer and a currently patterned second layer on the first layer in a non-destructive manner in a semiconductor manufacturing process for manufacturing semiconductor devices such as logic devices and/or memory devices such as DRAM, VNAND, etc. Through this, in-line process monitoring of a semiconductor process performed on a semiconductor wafer may be performed, and in some example embodiments, the semiconductor devices may be fabricated based on the in-line process monitoring.

As illustrated in FIG. 1, the electronic optical system 10 of the overlay measurement system may include a scanning electron microscope (SEM) configured to image the wafer W on which the multi-layered structure is formed.

For example, the electron microscope may include a stage 12 for supporting the wafer W, and an electron beam column 14 having an electron gun that generates a primary electron beam and an electron optical system that controls and/or focuses a direction and a width (or spot size) of the primary electron beam, and irradiating the beam onto the wafer W. Additionally, the electron microscope may include a detector 16, such as an electron detector or an electron scintillator, that detects a detection signal such as electrons emitted from the wafer W.

For example, the sample may be a semiconductor wafer W on which a multi-layered structure is formed. The wafer may refer to a substrate formed a semiconductor and/or non-semiconductor material. In some example embodiments, the wafer may have at least portions of various die or chips fabricated or at least partly fabricated thereon. The wafer may include one or more layers formed on a substrate. For example, such layers may include one or more of a photoresist, a dielectric material, a conductive material, etc.

As illustrated in FIGS. 2 and 3, the wafer W may include a die region DA and a scribe lane region SA surrounding the die region DA.

The die region DA may be a chip region where patterns constituting a semiconductor chip are formed. A plurality of the die regions DA may be formed to be spaced apart from each other along first and second directions D1 and D2. In some example embodiments, memory cells and peripheral circuit patterns may be formed in the die region DA; alternatively or additionally, logic circuit patterns may be formed in the die region DA.

The wafer W may be round, e.g. may be circular, and may have a diameter of 200 mm, or 300 mm, or 450 mm; example embodiments are not limited thereto. The die region DA may be rectangular, e.g. may be square; example embodiments are not limited thereto. The number of die regions DA on the wafer W may be more than, the same as, or less than that illustrated in FIG. 2. The wafer W may have a notch region (not shown) and/or a flat region (not shown).

The wafer W may be cut along the scribe lane region SA that divides the plurality of die regions DA by a sawing process or dicing process, so as to be individualized into a plurality of semiconductor chips.

Overlay marks 30 for alignment during a photo process may be formed in the scribe lane region SA. In addition, one or more test element groups (TEG) (not shown) for testing electrical characteristics and/or defects of various elements included in the semiconductor chip may be formed in the scribe lane region SA. As will be described later, since the overlay marks 30 are formed over the entire wafer W, an overlay wafer map and an asymmetry wafer map may be obtained, e.g., by using a voltage contrast (VC) response obtained through the overlay marks 30.

The overlay marks 30 may be formed by semiconductor processes that are performed to form the semiconductor chip patterns in the die region DA. The overlay marks 30 may be formed together with actual lower and upper patterns formed in the die region DA to correspond to the actual lower and upper patterns. For example, when a first upper structure is formed on a first lower structure in the die region DA by semiconductor processes such as a photolithography process, a second upper structure may be formed on a second lower structure in an overlay mark region by the same semiconductor processes. In this case, a first multi-layered structure as an actual die pattern may be formed in the die region DA by the semiconductor processes, and a second multi-layered structure as an overlay mark may be formed in the overlay mark region by the same semiconductor processes.

As illustrated in FIGS. 4 to 6, in some example embodiments, each of the overlay marks 30 may have particular, e.g. particularly programmed overlay values, such as dynamically determined (or, alternatively predetermined) programmed overlay values or designed overlay values. The overlay mark 30 may include test structures (second multi-layered structures) that are respectively formed in a plurality of test regions 32 arranged in a lattice shape. The test structures formed in test regions 32 may be designed to have different overlay values (or overlay offset values). The overlay values may be set or programmed to gradually change two-dimensionally along a specific direction (e.g., a first horizontal direction such as an X direction or a second horizontal direction such as a Y direction). The overlay value OL may be within a range of zero to several nanometers. For example, the overlay value OL may be within a range of −15 nm to +15 nm. In FIG. 5, + indicates an overlay in a first direction (e.g., a right direction) in red, and − indicates an overlay in a direction opposite to the first direction (e.g., a left direction) in blue.

When scanning the overlay mark 30 with an electron beam, the detector 16 may detect mainly secondary electrons (SE) and/or backscattered electrons (BSE) emitted from the wafer W. A voltage contrast (VC) image of the overlay mark 30 as an ebeam inspection image may be obtained from the detected electrons. In the voltage contrast image, a defective pattern and a normal pattern may be distinguished by different brightness, for example based on a conduction path to a ground. On the voltage contrast image, the defective pattern may appear relatively brighter than the normal pattern.

For example, as illustrated in FIG. 4, a second multi-layered structure in the first test region 32*a* may be programmed or designed such that an overlay value OL between a second lower structure 40 and a second upper structure 42 is 0, and a second multi-layer structure in the second test region 32*b* may be programmed or designed such that an overlay value OL between a second lower structure 40 and a second upper structure 42 has a specific value (for example, −14 nm). As illustrated in FIG. 6, the first test region 32*a* may appear relatively brighter than the second test region 32*b* on the voltage contrast image.

In some example embodiments, the processor 20 may obtain data on signal values (or voltage values) of a voltage contrast according to a programmed overlay value of the overlay mark 30 from electron beam inspection image data of the overlay mark 30, that is, voltage contrast image data. The overlay mark 30 may be designed such that voltage contrast values according to the programmed overlay values have a curve of a parabola, e.g. of a quadratic function. For example, all or at least a portion of a function from an overlay value (X) to a voltage contrast value (Y), which is obtained from the voltage contrast image data of the overlay mark 30 may be fitted to a parabola, e.g. to a quadratic curve. In this case, when the overlay value (X) is 0, the voltage contrast value (Y) may be a minimum value. In some example embodiments, a vertex of the parabola corresponds to a minimum of the parabola.

The function from the overlay value (X) to the voltage contrast value (Y) may be referred to as a defect function (and/or failure function). The defect function may be or may represent a voltage contrast value that changes according to an overlay value. In the defect function, the independent axis, or the X-axis coordinate may be a programmed or designed overlay value, and the dependent axis, or the Y-axis coordinate may indicate a defect rate such as an average defect rate (defect probability) of each test region corresponding to each overlay value. In some example embodiments, the average defect rate may be a mean defect rate, or a median defect rate, or a modal defect rate; example embodiments are not limited thereto. In the defect function of the programmed or designed overlay mark 30, the voltage contrast value may be or may correspond to a minimum value when the overlay value is 0, and the defect function may be symmetric about an axis having an overlay value of 0. However, in an actual defect function obtained from electrons emitted from the test structure (the second multi-layered structure) formed by an actual semiconductor process, due to 3D distortion such as asymmetry of the second lower structure, the voltage contrast value may not be a minimum value when the overlay value is 0, and the actual defect function may not be symmetric about an axis having a minimum voltage contrast value.

Hereinafter, detailed configurations of the processor that generates a defect function from electrons emitted from the overlay mark and determines overlay and asymmetry between upper and lower patterns will be described.

Figure 7:
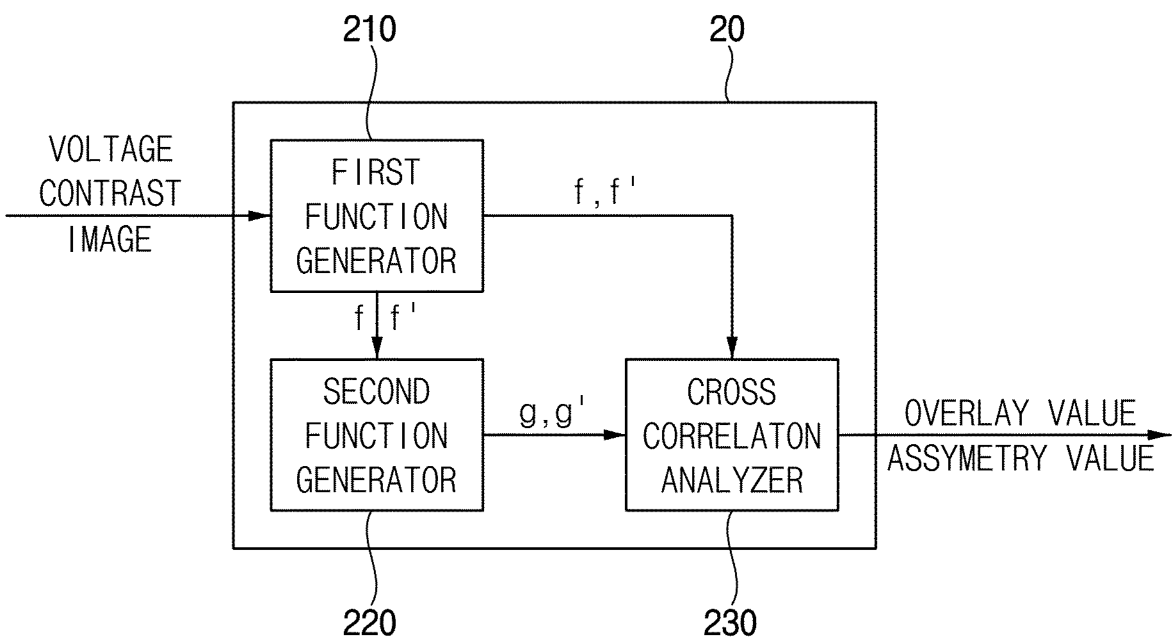
Figure 8:
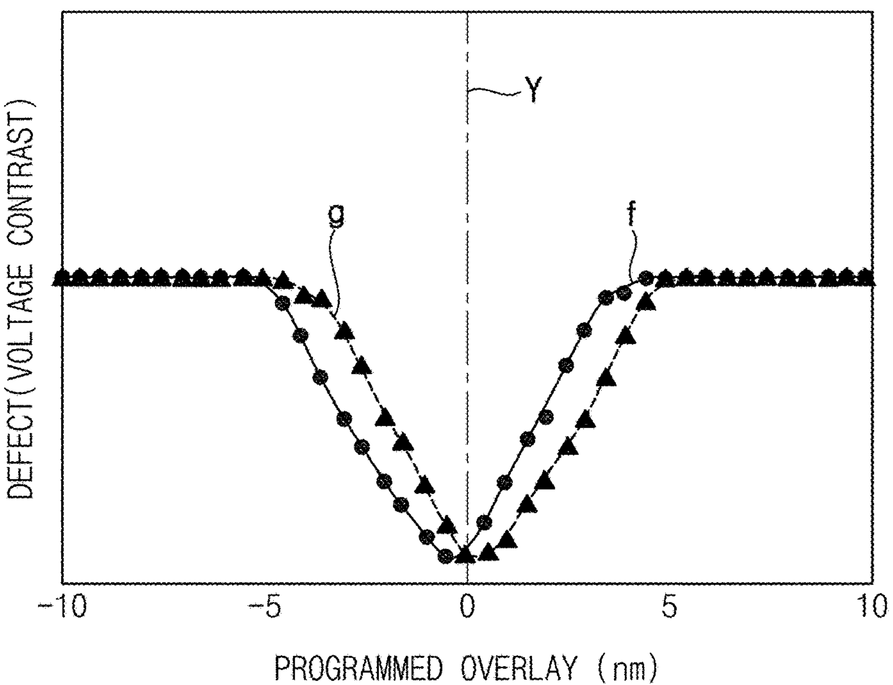
Figure 9:
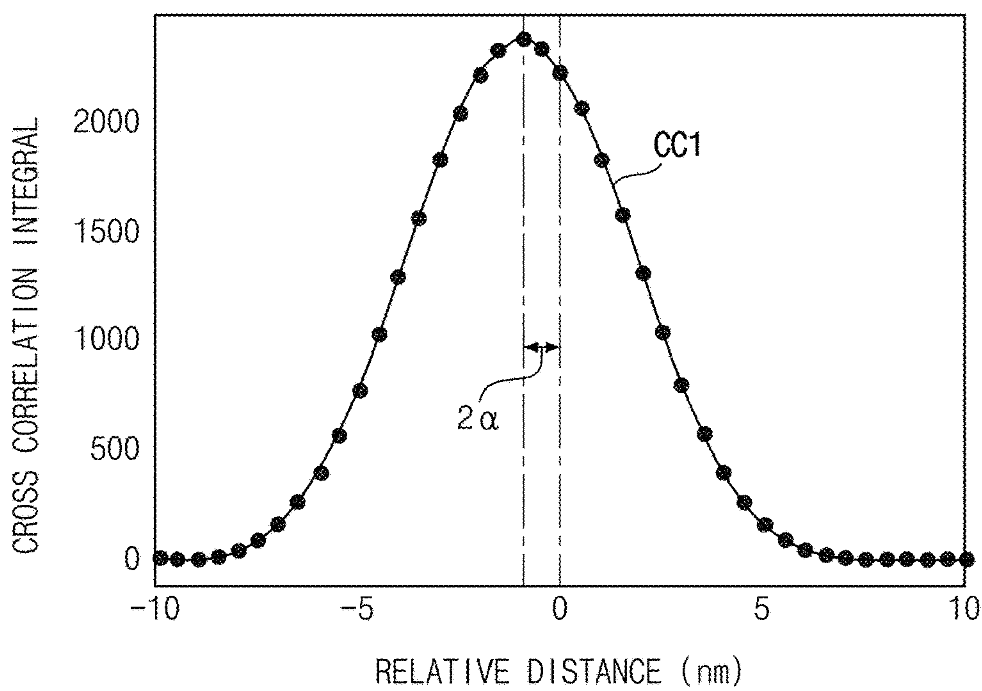
Figure 10:
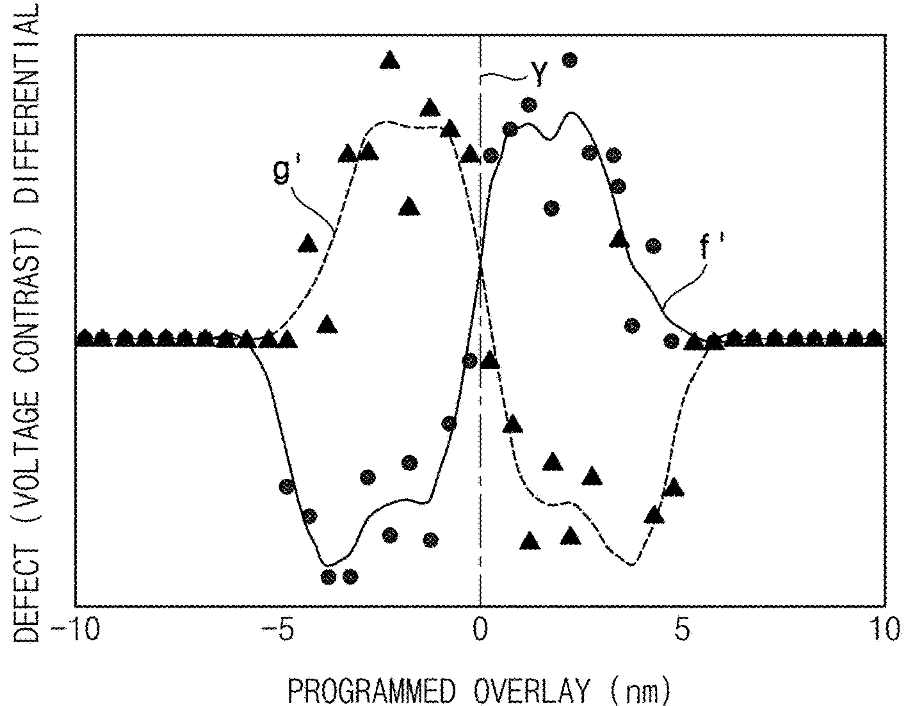
Figure 11:
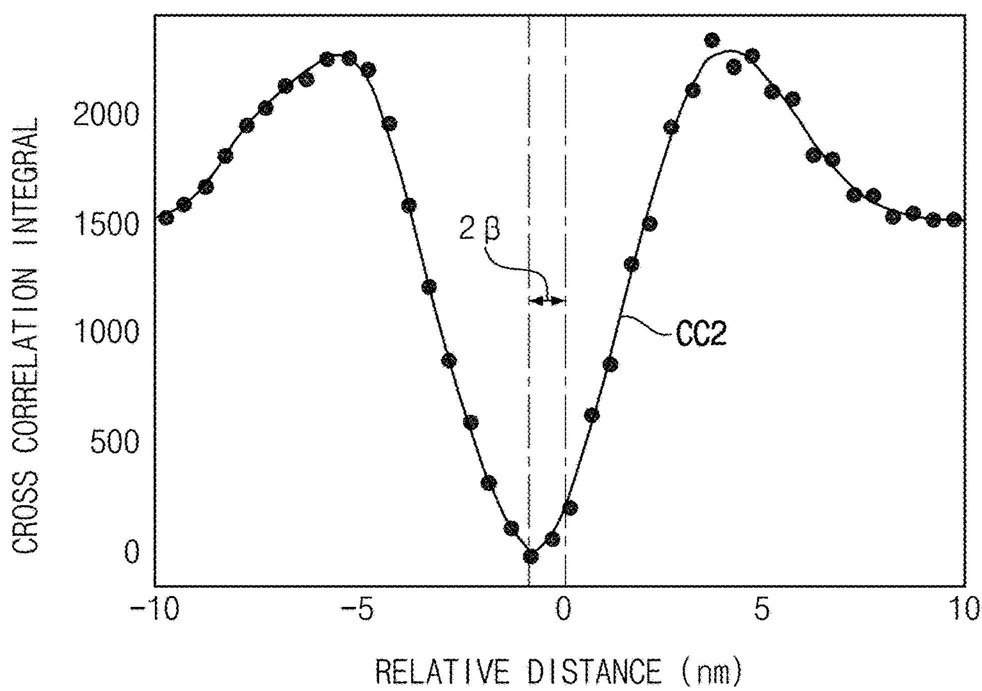

FIG. 7 is a block diagram illustrating a processor of the overlay measurement system of FIG. 1. FIG. 8 is a graph illustrating a defect function and a symmetric function of the defect function respectively generated by a first function generator and a second function generator in FIG. 7. FIG. 9 is a graph illustrating cross correlation between the defect function and its symmetric function performed by a cross correlation analyzer in FIG. 7. FIG. 10 is a graph illustrating a differential function of the defect function and a symmetric function of the differential function respectively generated by the first function generator and the second function generators in FIG. 7. FIG. 11 is a graph illustrating cross correlation between the differential function and the symmetric function performed by the cross correlation analyzer in FIG. 7.

Referring to FIGS. 7 to 9, the processor 20 may acquire and analyze images that are generated from electrons detected by the electron optical system 10 so as to calculate an overlay between an upper layer and a lower layer of the multi-layered structure. The processor 20 may obtain a defect function f that changes according to an overlay value, and may perform self-cross correlation on the defect function f to determine an overlay. The processor 20 may include a first function generator 210, a second function generator 220 and a cross correlation analyzer 230.

As illustrated in FIG. 8, the first function generator 210 may generate a function (a defect function) f from an overlay value to a voltage contrast value, from voltage contrast image data of the overlay mark 30. Additionally, the second function generator 220 may generate a symmetric function g of the defect function f that is generated by the first function generator 210. The symmetric function g may be obtained through a shift along a Y-axis symmetry of the defect function f about an axis having a programmed overlay value of zero, e.g. zero nm. At least portions of the defect function f and the symmetric function g form a parabola.

As illustrated in FIG. 9, the cross correlation analyzer 230 may perform cross correlation between the defect function f and the symmetric function g so as to obtain a cross correlation function CC1 and determine an overlay therefrom. The cross correlation function CC1 may be referred to as an autocorrelation function. Cross correlation can measure the similarity between two functions as a displacement function of the defect function f with respect to the symmetric function g. The cross correlation can be expressed by Equation (1) below.

$$(f * g)(\tau) \triangleq \int_{-\infty}^{\infty} \overline{f(t)} g(t+\tau) dt \qquad \text{Equation (1)}$$

Here, $\overline{f(t)}$ is a complex conjugate of f(t), and $\tau$ is referred to as displacement or lag. In equation 1, t is a dummy variable of integration.

By analyzing the cross correlation function CC1, it may be possible to obtain a distance 2α between an axis having a relative distance of zero and another relative distance value when the cross correlation function CC1 has a maximum value. The cross correlation analyzer 230 may output half α of the obtained distance 2α as an overlay value. The overlay value α may be or represent an improved, e.g., an optimal programmed overlay (M/A, misalignment) when defects such as overlay defects are reduced, e.g. are minimal.

Referring to FIGS. 7, 10 and 11, the processor 20 may obtain and analyze images from the electrons detected by the electron optical system 10 so as to calculate the asymmetry between the upper and lower layers of the multi-layered structure. The processor 20 may obtain a defect function f that changes according to the overlay value, and may perform self-cross correlation on a differential function f' of the defect function f to determined asymmetry.

As illustrated in FIG. 10, the first function generator 210 may differentiate the defect function f to generate the differential function f' of the defect function f. Additionally, the second function generator 220 may generate a second symmetric function g' of the differential function f' that is generated by the first function generator 210. The second symmetric function g' may be obtained by through Y-axis symmetry of the differential function f' about an axis having a programmed overlay value of 0.

As illustrated in FIG. 11, the cross correlation analyzer 230 may perform cross correlation between the differential function f' and the second symmetric function g' to obtain a second cross correlation function CC2 and determine asymmetry therefrom. The second cross correlation function CC2 may be an autocorrelation function obtained using Equation (1).

From the second cross correlation function CC2, it may be possible to obtain a distance 2β between an axis having a relative distance of zero nm and another relative distance value at a reduced, or a minimum value of the second cross correlation function CC2. The cross correlation analyzer 230 may determine and output a difference value α−β between the overlay value α and half β of the obtained distance as an asymmetry value.

In various example embodiments, the processor 20 may obtain the overlay values from the overlay marks 30 formed over the entire surface of the wafer W and provide an overlay wafer map. The semiconductor process may be corrected through the overlay values and the overlay wafer map.

Additionally or alternatively, the processor 20 may obtain the asymmetry values from the overlay marks 30 formed over the entire surface of the wafer W and may provide an asymmetric wafer map. The semiconductor process may be corrected or revised through the asymmetry values and the asymmetry wafer map.

As mentioned above, the overlay measurement system may detect electrons emitted from each of the overlay marks

30 that are formed over the entire surface of the wafer W, may generate the defect function f, and may perform self-cross correlation on the defect function f to determine the overlay. The overlay measurement system may generate the differential function f' of the defect function f and may perform self-cross correlation on the differential function f' to determine a quantified value for the asymmetry.

The overlay measurement system may acquire an accurate overlay value and a quantified value for the asymmetry by reflecting the effect of 3D distortion of the lower pattern, which could not be detected in the conventional overlay measurement method. Accordingly, it may be possible to identify or at least improve in identification of one or more causes of the 3D distortion of the lower pattern, and/or to improve the defect margin, and/or to improve the yield.

Hereinafter, a method of measuring an overlay using the overlay measurement system will be described.

Figure 12:
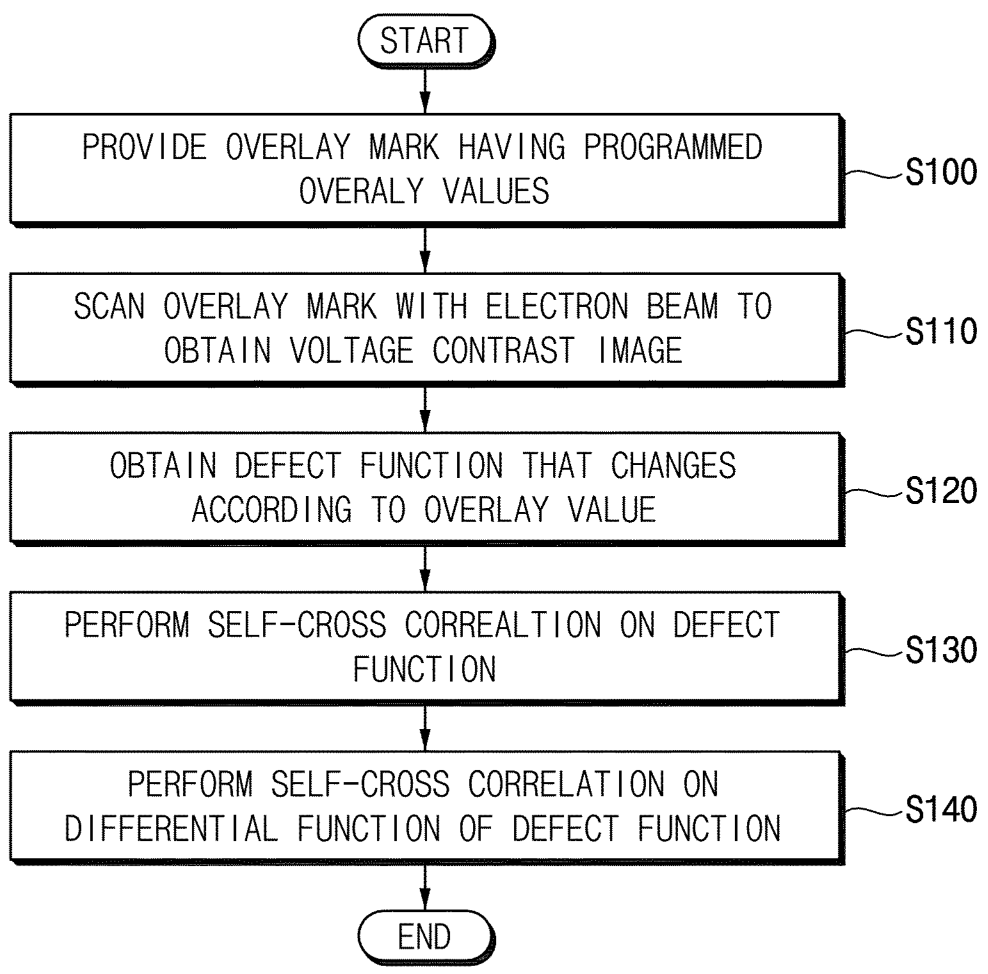
Figure 13:
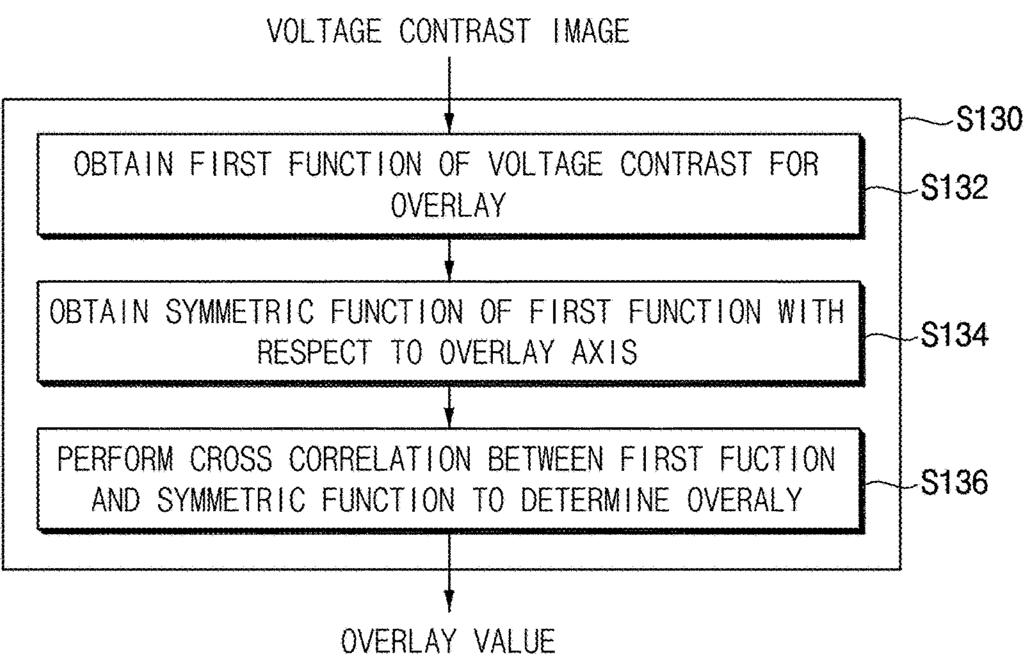
Figure 14:
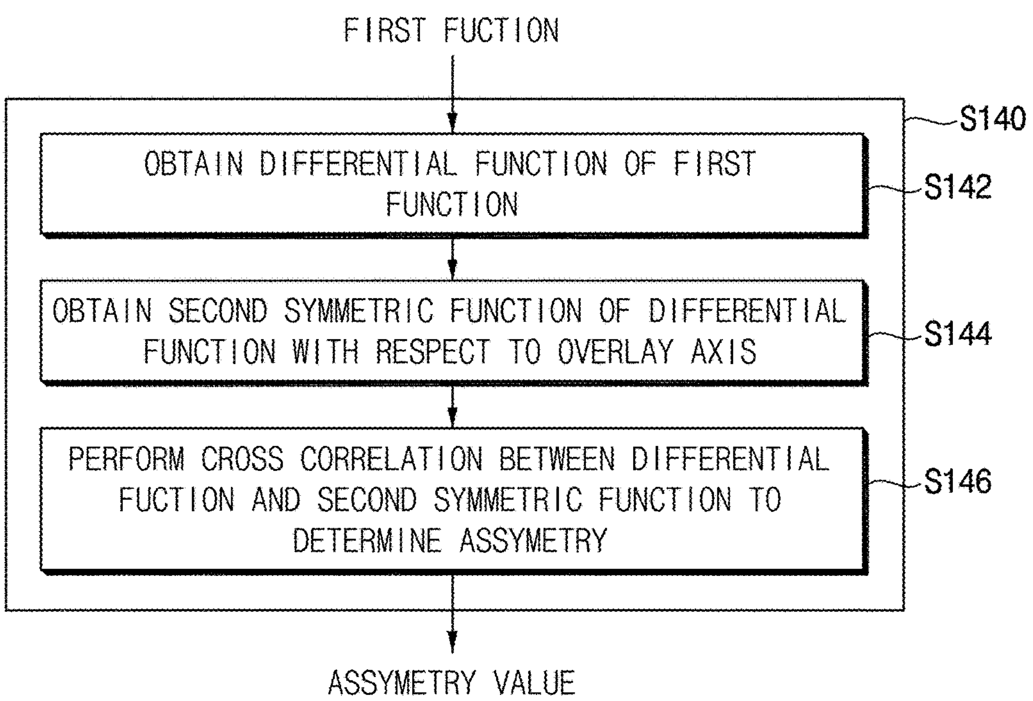

FIG. 12 is a flow chart illustrating an overlay measurement method in accordance with some example embodiments. FIG. 13 is a flow chart illustrating an overlay determination step in the overlay measurement method of FIG. 12. FIG. 14 is a flow chart illustrating an asymmetry determining step in the overlay measurement method of FIG. 12.

Referring to FIGS. 1 to 14, at least one overlay mark 30 having designed or programmed overlay values may be provided (S100), and the at least one overlay mark 30 may be scanned with an electron beam to obtain voltage contrast (VC) data as an electron beam inspection image (S110).

In some example embodiments, a wafer W on which the overlay marks 30 are formed may be placed on the stage 12 and the overlay marks 30 may be scanned with an electron beam to detect electrons emitted from the overlay marks 30.

Semiconductor chip patterns or semiconductor die patterns may be formed in a die region DA of the wafer W, and the overlay marks 30 for alignment during a photo process may be formed in a scribe lane region SA. The overlay marks 30 may be formed by semiconductor processes for forming the semiconductor chip patterns in the die region DA.

For example, when a first upper structure is formed on a first lower structure in the die region DA by semiconductor processes such as a photolithography process, a second upper structure may be simultaneously formed in a second lower structure in an overlay mark region in the scribe lane region SA. In this case, first multi-layered structures as actual semiconductor chip patterns may be formed in the die region DA by the semiconductor processes, and second multi-layered structures as overlay marks may be formed in the overlay mark region by the same semiconductor processes.

In various example embodiments, the overlay mark 30 formed in the overlay mark region may have programmed overlay values (overlay offset values). The overlay mark 30 may include test structures, for example, the second multi-layered structures that are respectively formed in a plurality of test regions 32 arranged in a lattice form. The test structures formed in test regions 32 may be designed to have different overlay values (overlay offset values). The overlay values may be programmed to gradually change two-dimensionally along a specific direction (X direction, Y direction).

When scanning the overlay mark 30 with an electron beam, the detector 16 may detect mainly secondary electrons (SE) and backscattered electrons (BSE) that are emitted from the wafer W. A voltage contrast (VC) image of the overlay mark 30 may be obtained as an electron beam inspection image from the detected electrons. In the voltage contrast image, a defective pattern and a normal pattern may be distinguished by different brightness. On the voltage contrast image, the defective pattern may appear relatively brighter than the normal pattern. For example, on the voltage contrast image, a first test region having a relatively larger overlay value may appear brighter than a second test region having a relatively smaller overlay value.

Then, a defect function f that changes according to the overlay value may be obtained from the voltage contrast image data (S120).

In some example embodiments, the first function generator 210 of the processor 20 may data on signal values (voltage values) of voltage contrast according to the overlay value from the voltage contrast image data that is obtained by detecting the electrons emitted from the overlay mark 30. The overlay mark 30 may be designed such that voltage contrast values according to the programmed overlay values have a curve of a quadratic function, e.g. the curve forms a parabola. For example, a function from an overlay value (X) to a voltage contrast value (Y), which is obtained from the voltage contrast image data of the overlay mark 30 may be designed to fit a polynomial function such as a quadratic curve. Alternatively or additionally, an average value (such as a mean value, a median value, or a mode value) of the voltage contrast values of the test regions in which the programmed overlay value (X) is zero may be designed to have a reduced or minimum value.

The function from the overlay value (X) to the voltage contrast value (Y) may be referred to as a defect function (or failure function) f. The defect function may be a voltage contrast value that changes according to an overlay value. In the defect function, the X-axis coordinate may be a programmed overlay value, and the Y-axis coordinate may indicate an average defect rate (defect probability) of each test region corresponding to each overlay value. In the defect function of the programmed overlay mark 30, the voltage contrast value may be a low or minimum value when the overlay value is zero (zero nm), and the defect function may be symmetric about an axis having an overlay value of zero. However, in an actual defect function obtained from electrons emitted from the test structure (the second multi-layered structure) formed by an actual semiconductor process, due to 3D distortion such as asymmetry of the second lower structure, the voltage contrast value may not be a minimum value when the overlay value is 0, and the actual defect function may not be symmetric about an axis having a reduced or minimum voltage contrast value.

As illustrated in FIG. 8, the first function generator 210 may generate a function (defective function) f from an overlay value to a voltage contrast value, from the voltage contrast image data of the overlay mark 30.

Then, self-cross correlation may be performed on the defect function f to determine an overlay (S130).

As illustrated in FIG. 13, a symmetric function g of the defect function f with respect to overlay axis Y may be obtained (S132), and cross correlation between the defect function f and the symmetric function g may be performed to determine an overlay (S134).

In particular, as illustrated in FIG. 8, the second function generator 220 of the processor 20 may define the defect function f generated by the first function generator 210 as a first function and generate the symmetric function g of the first function. The symmetric function g may be obtained through Y-axis symmetry of the defect function f with respect to an axis where the programmed overlay value is 0 (overlay axis Y).

Then, as illustrated in FIG. 9, the cross correlation analyzer 230 of the processor 20 may perform cross correlation between the defect function f and the symmetric function g to obtain a cross correlation function CC1 and determine an overlay from the cross correlation function CC1. Cross correlation can measure the similarity of two functions as a displacement function of the defect function f with respect to the symmetric function g. From the cross correlation function CC1, it may be possible to obtain a distance 2α between an axis having a relative distance of 0 and a relative distance value when the cross correlation function CC1 has a maximum value. The cross correlation analyzer 230 may determine half α of the obtained distance 2α as an overlay value.

Then, self-cross correlation may be performed on a differential function f' of the defect function f to determine asymmetry (S140).

As illustrated in FIG. 14, the differential function f' of the defect function f may be obtained (S142), a second symmetric function g' of the differential function f' with respect to overlay axis Y may be obtained (S144), and cross correlation between the differential function f' and the second symmetric function g' may be performed to determine asymmetry (S146).

In particular, as illustrated in FIG. 10, the first function generator 210 of the processor 20 may differentiate the defect function f as the first function to generate the differential function f' of the defect function f. The second function generator 220 of the processor 20 may generate a second symmetric function g' of the differential function f' that is generated by the first function generator 210. The second symmetric function g' may be obtained through Y-axis symmetry of the differential function f' with respect to an axis having a programmed overlay value of 0 (overlay axis Y).

Then, as illustrated in FIG. 11, the cross correlation analyzer 230 of the processor 20 may perform cross correlation between the differential function f' and the second symmetric function g' to obtain a second cross correlation function CC2 and determine asymmetry from the second cross correlation function CC2.

From the second cross correlation function CC2, it may be possible to obtain a distance 2β between an axis having a relative distance of 0 and a relative distance value at a minimum value of the second cross correlation function CC2. The cross correlation analyzer 230 may determine a difference value α−β between the overlay value α and half β of the obtained distance as an asymmetry value.

In various example embodiments, the overlay values may be obtained from the overlay marks 30 formed over the entire surface of the wafer W, and an overlay wafer map may be generated. Then, the semiconductor process may be corrected using the overlay values and the overlay wafer map.

Additionally or alternatively, the asymmetry values may be obtained from the overlay marks 30 formed over the entire surface of the wafer W, and an asymmetric wafer map may be generated. The semiconductor process may be corrected and/or revised or improved through the asymmetry values and the asymmetric wafer map.

Hereinafter, a method of manufacturing a semiconductor device using the overlay measurement method will be described.

Figure 15:
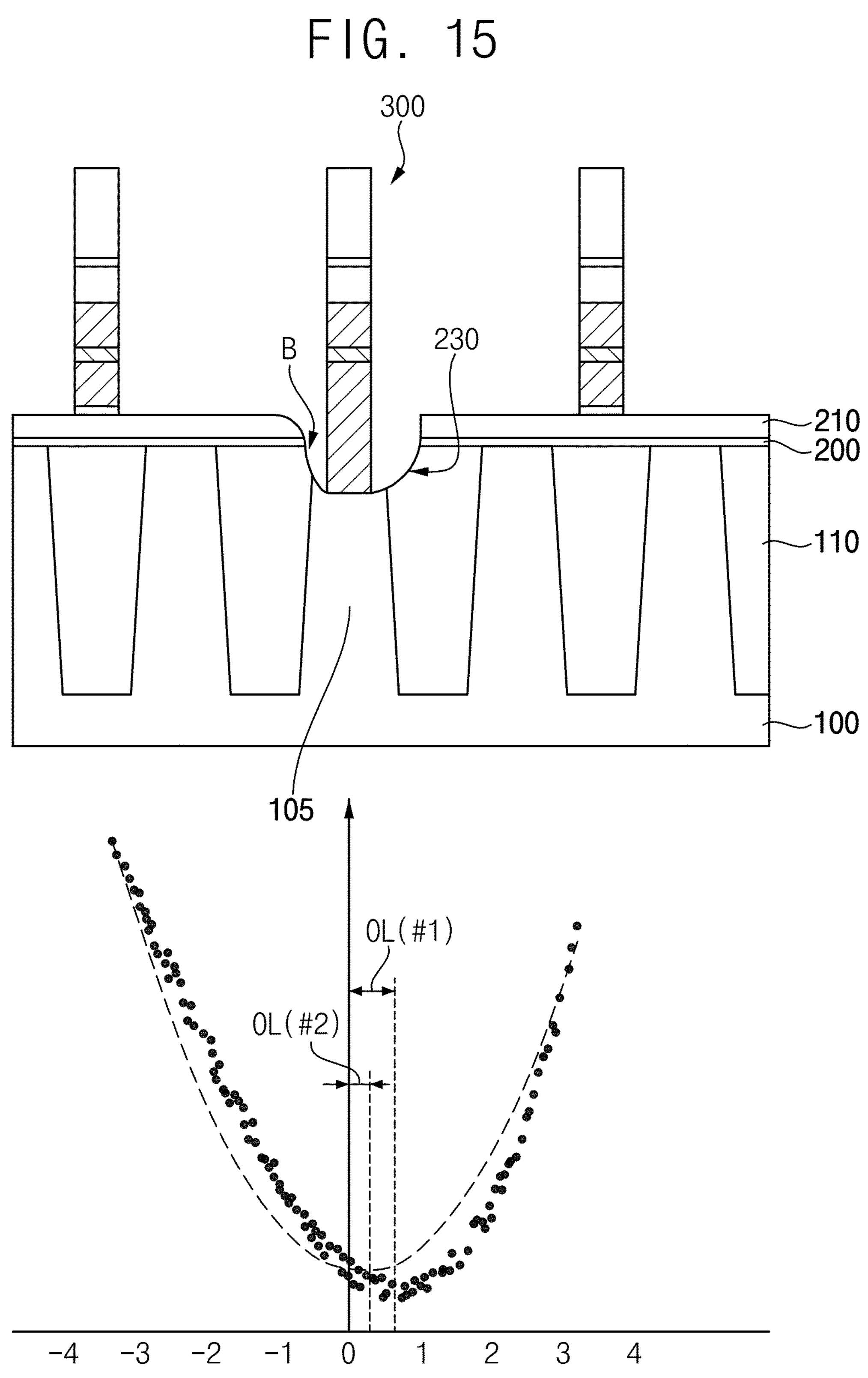
Figure 16:
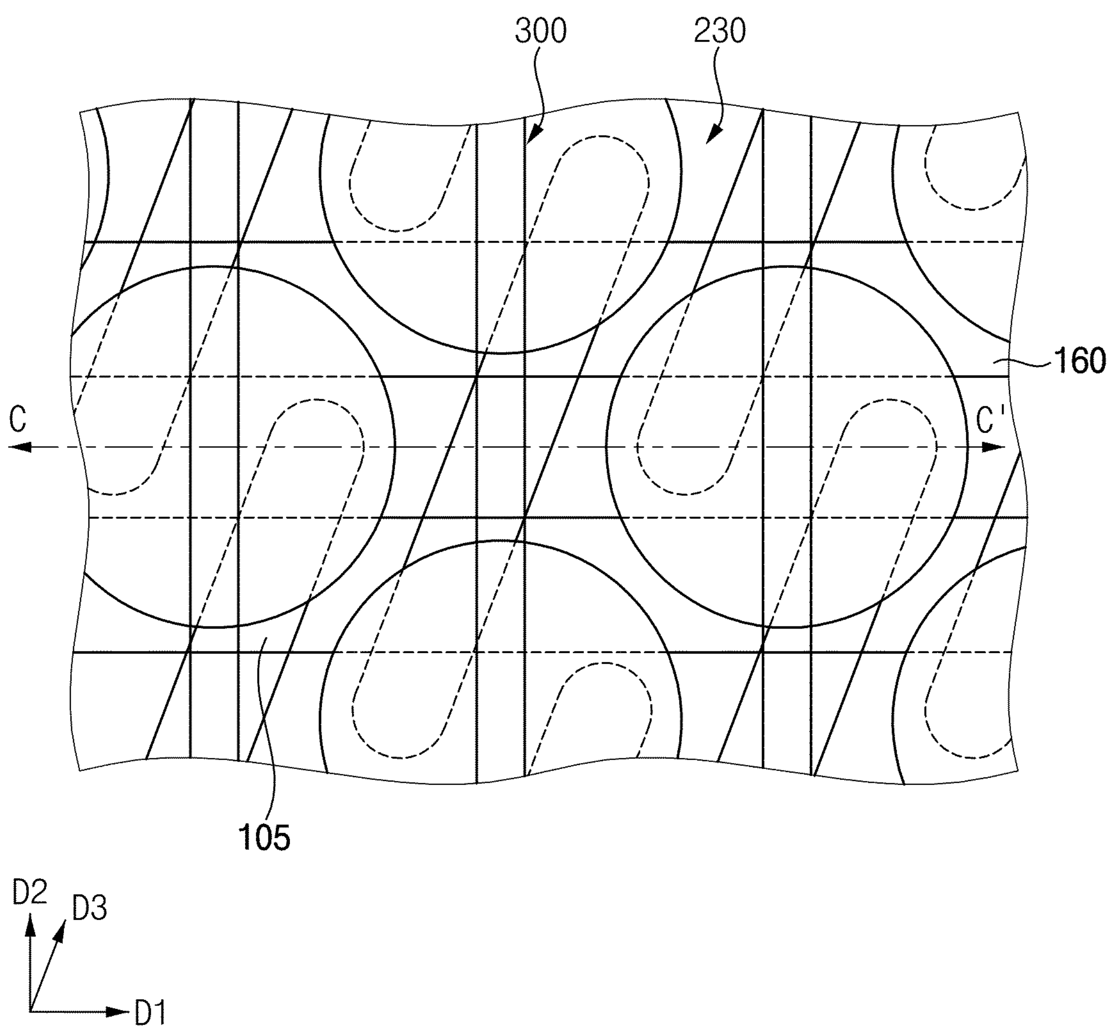

FIG. 15 is a cross-sectional view illustrating a step of forming an upper structure on a lower structure of a semiconductor device in accordance with example embodiments, and a graph illustrated a measured overlay between the upper structure and the lower structure. FIG. 16 is a plan view illustrating the upper structure formed on the lower structure in FIG. 15. The cross-sectional view of FIG. 15 is a cross-sectional view taken along line C-C' in FIG. 16. In FIGS. 15 and 16, the above overlay measurement method is described as being used in a bit line contact process (BLC) of a dynamic random access memory (DRAM) process, but is not limited thereto, and it will be understood that it is used for in-cell overlay measurements of upper and lower patterns of a flash memory or logic product.

Referring to FIGS. 15 and 16, a first multi-layered structure may be formed in a first region of a substrate 100 by a semiconductor process, and at least one overlay mark having programmed overlay values may be formed in a second region of the substrate 100 by the same semiconductor process.

In some example embodiments, the first region of the substrate 100 may be or may include a die region DA of a wafer W, and the second region of the substrate 100 may be or may include a scribe lane region SA of the wafer W. A plurality of the overlay marks may be respectively formed in overlay mark regions in the second region of the substrate 100.

For example, when a first upper structure is formed on a first lower structure in the first region of the substrate 100 by semiconductor processes such as a photolithography process, a second upper structure may be simultaneously formed on a second lower structure in the overlay mark region in the second region of the substrate 100. As illustrated in FIGS. 4 and 5, the overlay mark may have programmed overlay values.

The first multi-layer structure formed in the first region of the substrate 100 may include a first lower structure and a first upper structure formed on the first lower structure by the semiconductor process.

As illustrated in FIGS. 15 and 16, the first lower structure may be formed in the first region of the substrate 100. The first lower structure may include an active pattern 105 formed in a surface of the substrate 100, a device isolation pattern 110 adjacent to the active pattern 105, and an opening 230 formed in the active pattern 105 and the device isolation pattern 110. The first upper structure may include the opening 230 and a bit line structure 300 extending in a second direction D2 on an insulating layer structure 200 and 210 on the active patterns 105 and the device isolation pattern 110. A plurality of the bit line structures 300 may be formed to be spaced apart from each other along a first direction D1.

In particular, the active patterns 105 may be formed by removing an upper portion of the substrate 100, and the device isolation pattern 110 may be formed to cover sidewalls of the active patterns 105. Each of the active patterns 105 may be formed to extend in a third direction D3 and may be spaced apart from each other along the first and second directions D1 and D2.

Then, an impurity region (not illustrated) may be formed on the substrate 100 by, for example, an ion implantation process and/or a diffusion process, and then, the active pattern 105 and the device isolation pattern 110 formed in the first region of the substrate 100 may be partially etched to form the recess extending in the first direction and the gate structure 260 may be formed within the recess.

Then, the insulating layer structures 200 and 210 may be formed on the active patterns 105 and the device isolation pattern 110, a mask may be formed on the insulating layer structures 200 and 210, and an etching process may be performed using the mask as an etching mask to form the opening 230 that exposes the active pattern 105. An upper surface of a central portion of the active pattern 105 in the third direction D3 may be exposed through the opening 230. A plurality of the openings 230 may be formed on the first region of the substrate 100 along the first and second directions.

Then, after the mask is removed, a first conductive layer, a barrier layer, a second conductive layer, a mask layer, an etch stop layer and a capping layer may be sequentially formed to fill the opening 230, and the capping layer may be etched to form a capping pattern. The etch stop layer, the mask layer, the second conductive layer, the barrier layer and the first conductive layer may be sequentially etched using the capping pattern as an etching mask to form the bit line structure 300.

On the other hand, a second multi-layered structure formed in the second region of the substrate 100 may include a second lower structure formed in the overlay mark region and a second upper structure formed on the second lower structure by the semiconductor process for forming the bit line structure. The first and second lower structures may be formed on a same first layer, and the first and second upper structures may be formed on a same second layer.

After forming the first upper structure and the second upper structure, an overlay between the first upper structure and the first upper structure may be measured using the overlay measurement method described with reference to FIGS. 12 to 14.

In particular, at least one overlay mark may be scanned with an electron beam to detect secondary electrons, a voltage contrast image may be obtained from the detected secondary electrons, a defect function that changes according to an overlay value may be obtained from the voltage contrast image data, and a self-cross correlation may be performed on the defect function to determine an overlay between the first lower structure and the first upper structure. In addition, self-cross correlation may be performed on a differential function of the defect function to determine asymmetry. Then, the semiconductor process may be corrected based on the determined overlay and asymmetry.

As illustrated in FIG. 15, the opening 230 as an actual lower structure may be formed to have asymmetry, that is, three-dimensional distortion. In this case, a value when the detected voltage contrast value is the minimum may be determined as a first overlay value OL #1. The first overlay value OL #1 may have an error due to 3D distortion. In contrast, a value obtained by performing self-cross correlation on the defect function according to example embodiments may be determined as a second overlay value OL #2. The second overlay value OL #2 may be a value reflecting the 3D distortion of the lower structure, and may provide an accurate overlay value.

The above-mentioned overlay measurement system and overlay measurement method may be widely used in methods of manufacturing various semiconductor devices having upper and lower pattern structures such as various pads, contact holes, masks, wirings, etc. It will be understood that it can be used not only for the aforementioned DRAM, but also for a method of manufacturing a flash memory device and/or a logic device.

The foregoing is illustrative of various example embodiments and is not to be construed as limiting thereof. Although a few example embodiments have been described, those skilled in the art will readily appreciate that many modifications are possible in some example embodiments without materially departing from the novel teachings and advantages of the present invention. Accordingly, all such modifications are intended to be included within the scope of example embodiments as defined in the claims. Furthermore, example embodiments are not necessarily mutually exclusive with one another. For example, some example embodiments may include one or more features described with reference to one or more drawings, and may also include one or more other features described with reference to one or more other drawings.

What is claimed is:

1. An overlay measurement method, comprising:

providing an overlay mark having designed overlay values;

scanning the overlay mark with an electron beam to obtain a voltage contrast image;

obtaining a defect function from voltage contrast image data of the voltage contrast image, the defect function changing according to the designed overlay values; and performing self-cross correlation on the defect function to determine an overlay.

2. The overlay measurement method of claim 1, wherein the overlay mark is designed such that voltage contrast values according to the designed overlay values have a curve forming a parabola.

3. The overlay measurement method of claim 2, wherein in the parabola, the voltage contrast value is at a vertex when the overlay value is 0, and the defect function is symmetric about an axis having the overlay value of 0.

4. The overlay measurement method of claim 1, wherein the overlay mark includes multi-layered structures respectively arranged in a plurality of test regions, each multi-layered structure including a lower structure and an upper structure, and the upper structures to have the designed overlay values be misaligned with respect to the lower structures.

5. The overlay measurement method of claim 1, wherein the defect function is a function from the designed overlay values to voltage contrast values.

6. The overlay measurement method of claim 5, wherein the voltage contrast values indicate average defect rates of each test region corresponding to each overlay value.

7. The overlay measurement method of claim 1, wherein performing the self-cross correlation on the defect function to determine the overlay includes:

obtaining a function of the defect function that is symmetric about an axis for which the designed overlay value is zero; and performing cross correlation between the defect function and the symmetric function to determine the overlay.

8. The overlay measurement method of claim 7, wherein the cross correlation between the defect function and the symmetric function is defined by Equation (1), $$(f * g)(\tau) \triangleq \int_{-\infty}^{\infty} \overline{f(t)} g(t+\tau) dt \quad \text{Equation (1)}$$

where, f is the defect function, g is the symmetric function, $\overline{f(t)}$ is a complex conjugate of f(t), and $\tau$ is displacement or lag.

9. The overlay measurement method of claim 1, further comprising:

performing self-cross correlation on a differential function of the defect function to determine asymmetry.

10. The overlay measurement method of claim 9, wherein performing the self-cross correlation on the differential function of the defect function to determining the asymmetry includes:

obtaining the differential function of the defect function;

obtaining a second function of the differential function that is symmetric about an axis for which the designed overlay value is zero; and performing cross correlation between the differential function and the second symmetric function to determine the asymmetry.

11. An overlay measurement method, comprising:

scanning at least one overlay mark with an electron beam, the at least overlay mark including upper structures misaligned with respect to lower structures so as to have designed overlay values;

detecting secondary electrons emitted from the overlay mark to obtain voltage contrast data;

obtaining a defect function from the voltage contrast data of voltage contrast for overlay;

obtaining a function that is symmetric about overlay axis of the defect function; and performing cross correlation between the defect function and the symmetric function to calculate an overlay value.

12. The overlay measurement method of claim 11, wherein the at least one overlay mark is in a scribe lane region of a wafer.

13. The overlay measurement method of claim 11, wherein the overlay mark is designed such that at least some of the voltage contrast values according to the designed overlay values have a curve forming a parabola.

14. The overlay measurement method of claim 13, wherein in the parabolic function, the voltage contrast value has a vertex when the overlay value is zero, and the defect function is symmetric about an axis having the overlay value of zero.

15. The overlay measurement method of claim 11, wherein the designed overlay values gradually change along one direction.

16. The overlay measurement method of claim 11, wherein a voltage contrast value indicates an average defect rate of each test region corresponding to each designed overlay value.

17. The overlay measurement method of claim 11, wherein the overlay axis of the defect function is an axis for which the designed overlay value is zero.

18. The overlay measurement method of claim 11, wherein the cross correlation between the defect function and the symmetric function is defined by Equation (1), $$(f * g)(\tau) \triangleq \int_{-\infty}^{\infty} \overline{f(t)} g(t+\tau) dt \quad \text{Equation (1)}$$

where, f is the defect function, g is the symmetric function, $\overline{f(t)}$ is a complex conjugate of f(t), and $\tau$ is as displacement or lag.

19. The overlay measurement method of claim 11, further comprising:

performing self-cross correlation on a differential function of the defect function to determine asymmetry.

20. The overlay measurement method of claim 19, wherein performing the self-cross correlation on the differential function to determine the asymmetry includes:

obtaining the differential function of the defect function;

obtaining a second function of the differential function that is symmetric about an axis for which the designed overlay value is zero; and performing cross correlation between the differential function and the second symmetric function to determine the asymmetry.

* * * * *